(12) United States Patent
Osswald

(10) Patent No.: US 8,365,592 B2
(45) Date of Patent: Feb. 5, 2013

(54) MEASURING PROBE FOR A MEASURING DEVICE

(75) Inventor: Dirk Osswald, Schopfheim (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 576 days.

(21) Appl. No.: 12/312,433

(22) PCT Filed: Oct. 15, 2007

(86) PCT No.: PCT/EP2007/060964
§ 371 (c)(1),
(2), (4) Date: Jan. 12, 2010

(87) PCT Pub. No.: WO2008/055758
PCT Pub. Date: May 15, 2008

(65) Prior Publication Data
US 2010/0126288 A1  May 27, 2010

(30) Foreign Application Priority Data

Nov. 10, 2006  (DE) .......................... 10 2006 053 399

(51) Int. Cl.
*G01F 23/00* (2006.01)
(52) U.S. Cl. .................................. 73/290 R; 73/290 V
(58) Field of Classification Search ................ 73/290 R, 73/290 V
See application file for complete search history.

(56) References Cited

U.S. PATENT DOCUMENTS

| 3,183,586 A | 5/1965 | Sellers |
| 3,390,712 A | 7/1968 | McKay |
| 6,019,007 A | 2/2000 | Grieger |
| 7,592,946 B2 * | 9/2009 | Klees et al. .................. 342/124 |

FOREIGN PATENT DOCUMENTS

WO  WO 2004/088152 A1  10/2004

* cited by examiner

*Primary Examiner* — Hezron E Williams
*Assistant Examiner* — Rodney T Frank
(74) *Attorney, Agent, or Firm* — Bacon & Thomas, PLLC

(57) ABSTRACT

A measuring probe for a measuring device for ascertaining and monitoring fill level of a medium in a container. The measuring probe includes: a probe holding element, which is mounted on the container; and a probe element, which is secured in an axial bore of the probe holding element by means of a releasable securement structure. A first cavity is provided in the axial bore of the probe holding element and a second cavity on the probe element, and a locking element is provided, which, in a final position of the mounting of the probe element in the probe holding element, protrudes into the first cavity and into the oppositely lying second cavity on the probe element and, thus, forms an axial locking.

12 Claims, 3 Drawing Sheets

MEASURING PROBE FOR A MEASURING DEVICE

TECHNICAL FIELD

The present invention relates to a measuring probe for a measuring device for ascertaining and monitoring fill level of a medium in a container.

BACKGROUND DISCUSSION

Corresponding measuring devices are frequently applied in automation and process control technology. Such measuring devices are available from the firm of Endress+Hauser under the marks, LEVELFLEX® and MULTICAP®, which serve primarily to determine and/or to monitor fill level of a medium in a container.

The above described measuring devices are medium-contacting fill level measuring devices, wherein at least one probe element comes directly in contact with the medium to be measured. The measuring probe is constructed of at least one probe element and one probe holding element. The probe element is usually secured via a probe holding element to a process connection, i.e. an opening or a nozzle on the provided container.

In the following references, construction of such measuring probes and the coupling of the measuring signals into these measuring probes are described.

In German Patent, DE 10 2004 060 119 A1, a coupling unit for a time domain reflectometer is disclosed, in the case of which the probe element is connected via a threaded connection with the coupling unit of the measuring probe. This construction has the advantage, that the probe element can be exchanged and mounted on-site.

Other combinations of probe elements with coupling units are shown in U.S. Pat. No. 6,178,817 B1, German Patent DE 100 45 235 A1 and German Patent DE 100 03 941 A1. In the case of this type of measuring probe connections, the probe element is connected with a threaded lug by means of a connecting element outside of the coupling unit in the process space.

The above described measuring probe, screwed connections are applicable also in the case of a measuring device working according to a capacitive or conductive measuring method. In German Patent DE 2003 00 901 U1, a simple measuring probe securement for a capacitive measuring device is described.

In the state of the art, there are different approaches for releasable measuring probe securements. These have, however, the disadvantage, that the probe element can loosen from the measuring probe securement due to vibrations or because of extraordinary forces. If a probe element loosens completely from the securement in the probe coupling unit, measuring is no longer possible. Furthermore, a fallen probe element in a funnel silo, which, most often, has a feed screw or pump in the lower region, can cause a large amount of damage.

SUMMARY OF THE INVENTION

An object of the invention, therefore, is to provide for a measuring device a measuring probe, which enables a simple, secure, releasable and cost effective securement of a probe element.

In a measuring device of the initially described type, the object of the invention is achieved by the features that there are provided a first cavity in the axial bore of the probe holding element and a second cavity on the probe element, and that a locking element is provided, which, in a final position of the mounting of the probe element in the probe holding element, protrudes into the first cavity and into the oppositely lying, second cavity on the probe element and, thus, forms an axial locking.

In an advantageous form of embodiment of the invention, it is provided, that the locking element, the first cavity and/or the second cavity are embodied and arranged relative to one another in such a manner that a predefined axial tensile force is applied to the probe element for releasing the axial locking.

In an especially preferred form of embodiment of the invention, it is provided, that a screw thread is provided as releasable securement means.

In an advantageous form of embodiment of the measuring device of the invention, it is provided, that a bayonet securement is provided as releasable securement means.

In a preferred form of embodiment of the invention, it is provided, that the locking element remains in the first cavity or in the second cavity during the releasing of the axial locking.

A purpose-supporting embodiment of the measuring device of the invention includes that a resilient, annular element is provided as a locking element.

In an embodiment of the measuring device of the invention, it is provided, that the locking element is embodied as a spring-biased element.

In an especially preferred form of embodiment of the invention, it is provided, that, as a locking element, an O ring of an elastic material is provided, which fulfills a sealing function supplementally to the locking function.

An advantageous embodiment of the solution of the invention provides that the releasable securement means is embodied as an integral part of the locking element.

An especially advantageous further development of the solution of the invention provides, that the first cavity has an undercutting relative to the locking element and/or that the second cavity on the probe element has an overcutting relative to the locking element.

In a useful embodiment of the measuring device of the invention, it is provided, that the second cavity on the probe element has chamfers or roundings on at least one edge of the second cavity for improving releasability of the probe element.

A suitable embodiment of the measuring device of the invention provides that the probe holding element is embodied as at least two parts and, at a location of separation of individual parts, the first cavity is located, in which the securement element is insertable before assembly of the individual parts.

The aforementioned as well as that which is claimed and in the examples of embodiments described components to be used according to the invention are subject to no especially exceptional conditions in their size, shape, form, selection of material and technical designs, so that the selection criteria known in the field of application can be used without limitation.

In view of the earlier set-forth features, the invention achieves the advantages and characteristics, that a releasable, unloosenable and reusable securement of the releasable securement means of a measuring probe are assured by a locking element of the invention.

BRIEF DESCRIPTION OF THE DRAWINGS

Other details, features and advantages of the subject matter of the invention will become evident from the following description of the appended drawing, in which preferred examples of embodiments of the invention are presented. In the figures of shown examples of embodiments of the invention, in order not to clutter and for simplification, components, or assemblies of components, which correspond in construction and/or in function, are provided with equal reference characters. The figures of the drawing show as follows.

DETAILED DISCUSSION IN CONJUNCTION WITH THE DRAWINGS

Figure 1:
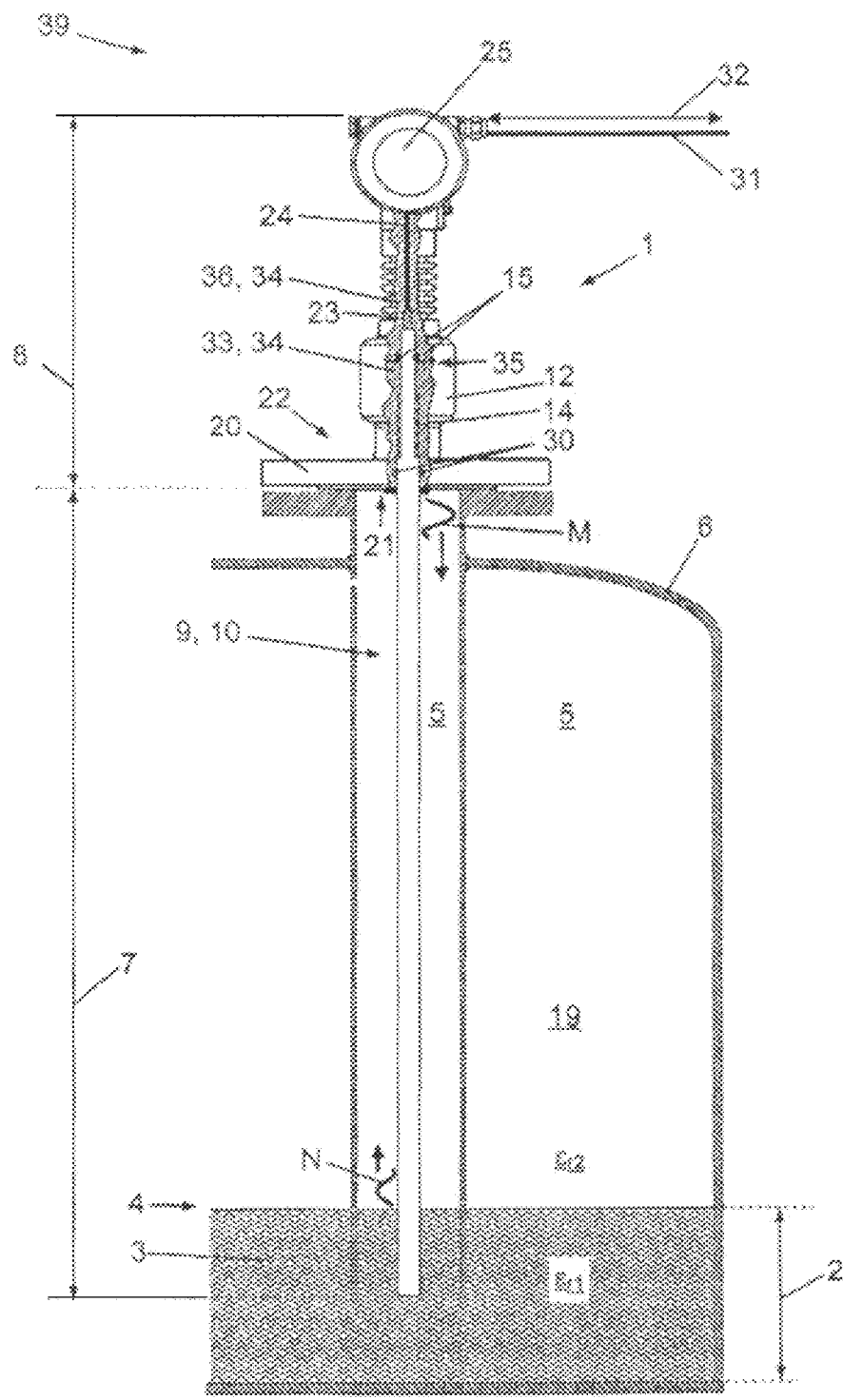
FIG. 1 is a schematic, total drawing of a fill-level measuring device mounted on a container and having a measuring probe of the invention.

FIG. 1 shows a fill-level measuring device 39 in the form of a time-domain reflectometer, or TDR, measuring system for ascertaining the continuous fill level 2 of a medium 3 in the process space 19 of a container 6 on the basis of the travel-time measuring method for a transmission pulse M on a measuring probe 1. The measuring probe 1 of the time domain reflectometer is composed essentially of two regions, a measurement-active region 7 and a measurement-inactive region 8. The process contacting part of the probe element 9, which usually is embodied as a rod or a cable, represents, in such case, the measurement-active region 7 of the measuring probe 1. The measurement-inactive region 8 of the measuring probe 1 serves essentially for holding the probe element 9 in a probe holding element 12 and for coupling, or supplying, the transmission pulse M into the probe element 9. The probe coupling element, or the probe holding element, 12 of the fill level measuring device 39 is connected, for example, by means of a process adapter 22 via a process thread 21 with a flange 20, which, in turn, is mounted on the container 6. The part of the probe element 9 protruding into the probe holding element 12 and the metal wall of the process adapter 22 form a coaxial waveguide in this measurement-inactive region 8 of the measuring probe 1. It is naturally also possible, that a special outer conductor be integrated in the probe coupling element 12. Via the probe coupling element 12 embodied as a coaxial system, the high-frequency measurement signal produced in a high frequency unit in the measurement transmitter 25 is coupled as transmission pulse M into the probe element 9. This coaxial system is so embodied in the measurement-inactive region 8 of the measuring probe 1, that the transmission pulse M can be transmitted into and out of this coaxial system almost loss-free. The wanted echo signals N, which are at least partially reflected due to changes of the wave resistance, travel back on the probe element 9 and are received by the measurement transmitter 25. The connection of the high frequency unit in the measurement transmitter 25 to the probe element 9 occurs, for example, via a coaxial line 24 with coaxial plug 38 and coaxial socket 23 at the upper end of the probe element 9. The probe element 9 is shown in this drawing in FIG. 1 as a coaxial probe 10, composed of an outer conductor and an inner conductor. There are, however, also other applicable forms of embodiment of probe elements 9, such as e.g. a Sommerfeld waveguide (single-wire waveguide), a Goubau waveguide (single-wire waveguide with dielectric coating), a Lecher line (two-wire waveguide), a microstrip waveguide or a hollow conductor with any, rectangular or round, cross sections.

The TDR measuring method works according to a measuring principle, in which high-frequency measuring signals are transmitted via the probe element 9 as a transmission pulse M in the direction of the medium 3, or into the process space 19. This transmission pulse M is, either due to a DK-value jump, or a discontinuity of the dielectric constant $\in_r$ of the material surrounding the probe element 9, reflected back as wanted echo signal N, or due to a change of the geometry of the probe element 9, partially in the form of a disturbance echo signal. A discontinuity of the dielectric constant $\in_r$, or the wave resistance, is present, for example, at the boundary 4 of the medium 3, when the dielectric constant $\in_{r2}$ of the gas phase 5 superimposed on the medium 3, especially in the case of air $\in_{r2} \gg 1$, is smaller than the dielectric constant $\in_{r1}$ of the medium 3. With the measured travel time and knowledge of the propagation velocity of the high-frequency measuring signal, the one-way traveled distance can be calculated. The fill level 2 of the medium 3 in the container 6 equals the height of the container 6, or the height of the coupling of the high-frequency measuring signals into the probe element 9, minus the one-way traveled distance of the high-frequency measuring signals. Taking into consideration the geometry of the container 6, then fill level 2 of the medium 3 is ascertained as a relative or an absolute quantity. An advantage of time-domain reflectometry relative to other fill level measuring methods is that the measurement results are largely independent of product characteristics (e.g. density, dielectric constant or conductivity), the process conditions (e.g. unsettled surfaces or foam formation), as well as the properties of the container 6 (e.g. shape, size or installed objects).

The received high-frequency measuring signals, composed of wanted echo signals N, transmission pulses M and disturbance echo signals, are, moreover, evaluated both from a measurements point of view and from a signals point of view in a control/evaluation unit in the measurement transmitter 25, wherein the signals are, for example, filtered, time transformed and smoothed. The so obtained measured value of fill level 2, or an echo curve mapping the entire measuring situation, is forwarded, for example, via a bus interface 29, onto the fieldbus 32, for transmission to, for example, a control station and/or other field devices. The measured value of fill level 2, or the echo curve, can, however, also be presented on an integrated display or on an output/input unit of the fill-level measuring device 39. Energy supply of the fill-level measuring device 39 is provided, for example, by means of a two-wire line. A separate supply line 31 for energy supply is absent, when the fill-level measuring device 39 is a so called two-conductor measuring device, whose communication via the fieldbus 32 and the energy supply via the supply line 31 occurs exclusively and simultaneously via a two-wire line. Data transmission, or communication, via the fieldbus 32 is accomplished, for example, according to the CAN-, HART-, PROFIBUS DP-, PROFIBUS FMS-, PROFIBUS PA-, or FOUNDATION FIELDBUS-standard.

The securement system of the invention for the probe element 9 in the coupling unit, or the probe holding element, 12 is applicable, for example, also for a fill-level measuring device 39 working according to a capacitive measuring method. With the capacitive measuring method, both a continuous measuring of fill level 2 and also a signaling of the reaching of a predetermined fill level are possible, wherein, in the latter case, this then involves a limit level switch. In a capacitive measuring method, a probe element 9 and the wall of the container 6 or at least one further probe element 9 form a capacitor, whose dielectric is the medium 3 in the container. The capacitance of this capacitor is, in such case, dependent on, among other things, the fill level 2 of the medium 3, so that, from changing capacitance, fill level 2 can be deduced. When the degree of covering of the probe element 9 with the medium, or the fill level of the medium in the container, changes, an almost proportional change of the capacitance of the measurement structure is detected. An approximately analog measuring principle rests on a conductive measuring method, wherein the change of conductivity as a function of fill level of a conductive medium in the container is ascertained. The different examples of embodiments for measuring capacitance can be learned, for example, from the Offenlegungsschrifts DE 101 57 762 A1 or DE 101 61 069 A1 of the assignee. Usually, for measuring the capacitance value of the probe element 9, an operating signal is supplied, which is, most often, an electrical, alternating voltage. Probe element 9 is usually either a rod or a cable.

Before the mounting of the fill-level measuring device 39 on the flange 20 of the container 6, the probe element 9 is secured to the probe coupling element 12. This is accomplished by inserting the probe element 9 into the axial bore 13 of the probe coupling element 12 and connecting it with the securement element 14 in the coupling unit 12. The securement element 14 is, for example, a screw thread on the probe element 9 and a screw thread in the axial bore 13 of the coupling unit 14. In order to prevent an unintentional releasing of the probe element 9 held in the probe coupling element 12 by the securement element 14 due to vibration and shaking, a locking element 15 provides an effective axial locking. In the completely mounted state of the probe element 9 in the axial bore 13 of the probe coupling element 12, this locking element 15 sits in a cavity 17 on the probe element 9 and in a cavity 16 in the axial bore 13 of the coupling unit 12. The associating and embodiment of the locking element 15, the first cavity 16 and the second cavity 17 are, for example, so provided, that the probe element 9, held by the securement element 14, can still be turned up to a certain degree in the probe holding element 12. However, after a predetermined axial shifting of the probe element 9 in the axial bore 13 of the probe holding element 12, the locking element 15 engaged in the two cavities 16, 17 acts as an axial locking, which prevents further axial translation of the probe element 9. The locking element 15 is, for example, embodied as a resilient, annular element 28, which can be overcome in the axial direction only by a predetermined axial tensile force T. The geometry of the cavities 17 on the probe element 9 and the geometry of the cavities 16 in the axial bore 13 of the coupling unit 12 are so embodied, that the locking element 15, only after application of a predetermined axial tensile force T, springs out, for example, from the second cavity 17 on the probe element 9 and, thus, by canceling this of axial locking, the probe element 9 can be easily removed from the probe coupling element 12.

The securement element 14, the first cavity 16, the second cavity 17 and the locking element 15 are so embodied according to the invention, that no disturbance reflections of the high-frequency measuring signal are created in the measurement-inactive region 8 of the measuring probe 1 in the form of a coaxial conduction system due to resistance changes from geometrical changes.

Figure 2:
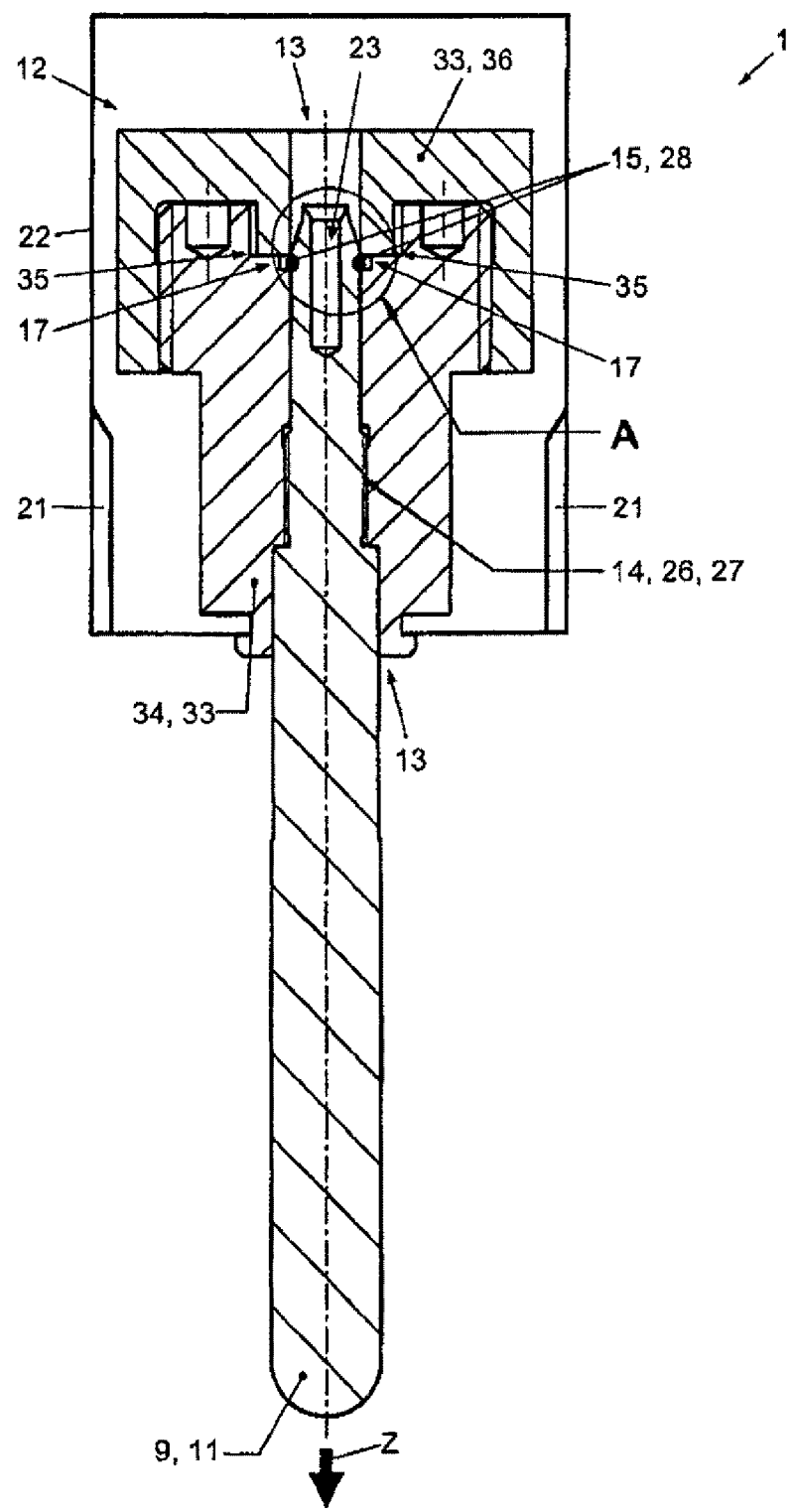
FIG. 2 is a schematic drawing of a cross section of the example of an embodiment of the measuring probe of the invention.

FIG. 2 shows a cross sectional view of a part of a probe coupling element 12 of the measuring probe 1 of the invention, for example, of the fill-level measuring device 39 illustrated in FIG. 1. In order not to clutter this drawing of the measuring probe 1, it was reduced to its essentials. Shown in the drawing of this example of an embodiment of a measuring probe 1 are, for example, a probe holding element, or probe coupling element, 12 in a process adapter 22, which is constructed of different individual parts 33. In a process adapter 22, a probe holding element 12 is embodied as an insulating sleeve 34 with a mounted lid 36. The insulating sleeve 34 has a locking element 15 in the first cavity 16 formed at the location of separation 35. The insulating sleeve 34 and the lid 36 are constructed of a microwave transmissive, dielectric material, e.g. a synthetic material. The probe coupling element 12 must not necessarily be made of a plurality of parts, to the extent that the locking element 15 is so embodied, that it can be inserted and positioned through the axial bore 13 in the probe coupling element 12. A probe element 9 is inserted into the axial bore 13 in the insulating sleeve 34 and held tightly in a final position by the securement element 14, e.g. a screw thread 26 or bayonet securement 27. In this final position, the locking element 15 held in the first cavity 16 of the insulating sleeve 35 engages automatically in a second cavity 17 on the probe element 9. The locking element 15 is embodied, according to the invention, as an annular, resilient element 28, a spring-biased element 29 or an O ring 30; there are, however, also other types thinkable. The engaged locking element 15 is so inserted in the second cavity 17, that this axial locking of the locking element 15 cannot be overcome by unintentional, axial force acting on the probe element 9 due to vibrations or by process-related twisting of the probe element 9. In the simplest embodiment, the first cavity 16 and the second cavity 17 are embodied as encircling grooves on the probe element 9 or in the axial bore 13 of the insulating sleeve 35 and the locking element 15 as a resilient, open, retaining ring. Starting from a predetermined axial pulling force T on the probe element 9 for releasing of the axial locking action of the locking element 15, for example, by means of a rotational movement on the probe element 9, which is performed, for example, by a mechanic or operator of the fill-level measuring device 39 using a tool in the disassembly of the probe element 9 from the probe coupling element 12 of the measuring probe 1, the axial locking of the locking element 15 in the second cavity 17 of the probe element 9 can be overcome.

Figure 3:
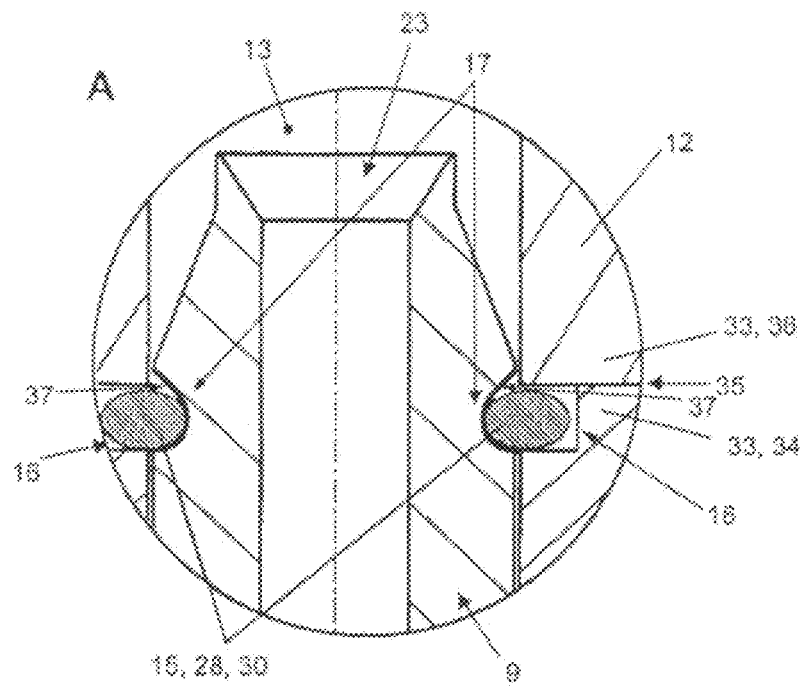
FIG. 3 is an enlarged drawing of the detail A of the cross section of a first example of an embodiment of the measuring probe of the invention shown in FIG. 2.

For better illustration of the first example of an embodiment of a self-securing, locking mechanism of the probe element 9 in the probe coupling unit 12, the section A of FIG. 2 is shown enlarged in FIG. 3. The locking element 15 is fixedly held in the first cavity 16, for example, by a slight narrowing, or an undercutting, of the first cavity 16 toward the axial bore. The locking element 15 does not, for example, have to be clamped by the individual parts 33. An axially exact orientation of the locking element 15 is assured by this first cavity 16, in which the locking element 15 can freely expand. If the probe element 9 is secured in the axial bore, the locking element 15 protrudes in a final position of the securement of the probe element 9 into the second cavity 17. The second cavity 17 on the probe element 9 includes relative to the first cavity 16, for example, on the upper corner of the probe element 9 a chamfer, a rounding, or an overcutting, which so is embodied, that the locking element 15 springs out of the second cavity 17 only through applying of the predetermined axial tensile force T on the probe element 9 and, as a result, the axial locking of the probe element 9 is released. Through the particular embodiment of the cavities 16, 17 and the locking element 15, it is achieved, that the locking element 15, in the case of the disassembly of the probe element 9, remains in the first cavity 16 between the insulating sleeve 34 and the lid 36 and the probe element 9 is released by the springing of the locking element 15 out of the second cavity 17. Thus, it is possible to remove the probe element 9 of the measuring probe 1 from the coupling element 12 of the measuring probe 1 only by production of a predefined axial tensile force T. To this end, for example, by means of a rotational movement of the probe element 9 with assistance of a spanner wrench, which is applied in a wrench cavity on the probe element 9, the securement element 14 in the form of screw thread 26 produces the predefined axial tensile force T. Other mechanisms for releasing of the probe element 9 are, for example, hooks, which engage in a groove or bore and effect a rotational movement for producing a predefined axial tensile force T on the probe element 9. The locking element 15 springs, upon application of this predefined axial tensile force T, out of the second cavity 17 and the probe element 9 is released, wherein the, for example, unlosable, resilient, annular element 28 remains in the insulating sleeve. In the case of subsequent mounting of a new or cleaned probe element 9, the resilient, annular element 28 remaining in the first cavity 16 snaps back into the second cavity 17 on the probe element 9 and secures, thus, the entire securement system of the probe element 9 against an unintentional releasing.

Other locking elements 15, besides the resilient, annular element 28, include, for example, a spring-biased element 29 and/or an O ring 30, such as e.g. a round wire ring according to DIN 7993 or a retaining ring according to DIN 471/472, which are, however, not explicitly shown in the figures. A spring-biased element 29 is, for example, so embodied, that a pin, a cylinder or a ball is placed in a bore—as second cavity 17 in the insulating sleeve 34—and pressed, via force of a spring in this bore, into the first cavity 16 on the probe element 9. The spring force and the embodiment of the first cavity 16 determine, in this case, the force, which must be applied for overcoming the axial locking, or the locking force, of the locking element 15. In order that the pin, the cylinder or the ball remains unlosable in the bore, such is held by a narrowing of the bore. The O ring 30 can, depending on embodiment of the cavities 16, 17 have, besides its effect as axial locking of the probe element 9, or the securement element 14, supplementally, a sealing action. As further securement element 14, for example, besides the screw thread 26, a bayonet securement 27 is used, which is not shown explicitly in the figures.

The exact mounting of the probe element 9 in the probe coupling element 12 can be checked, for example, by the following procedure in the mounting. Placed on the shaft of the probe element 9 are two markings, for example, in the form of notches encircling the probe element 9, so that, in the case of a probe element 9 completely mounted in the probe coupling element 12, the first marking on the edge 37 toward the insulating sleeve 34 is still well visible and the second marking is completely hidden by the axial bore 13 in insulating sleeve 34. Upon slight back rotation of the probe element 9 until the occurrence of counterforce due to the axial locking of the locking element 12, in the case of exact mounting of the probe element 9, the second marking becomes no longer visible on the edge 37 toward the insulating sleeve 34. With this visual technique, the exact mounting of the probe element 9 in the probe coupling element 12 is easily checkable by the two markings on the probe element 9.

Figure 4:
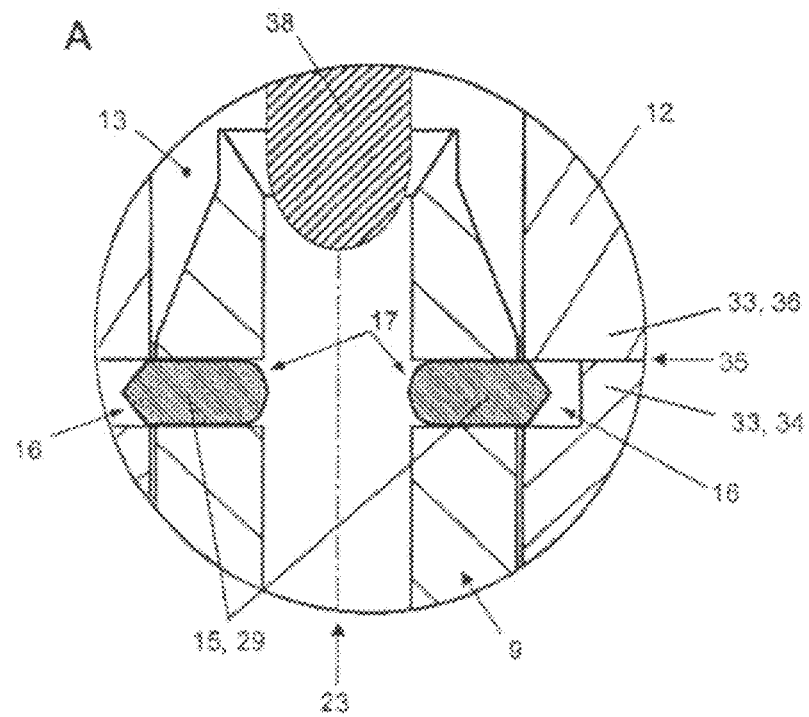
FIG. 4 is an enlarged drawing of a detail A of the cross section of a second example of an embodiment of the measuring probe of the invention shown in FIG. 2.

FIG. 4 shows on the basis of an enlarged section A of FIG. 2 a second example of an embodiment of a self-securing locking mechanism of the probe element 9 in the probe coupling unit 12. In the case of this example of an embodiment, at least two locking elements 15, which, for example, are embodied as pins, cylinder or spheres, are provided in two second cavities 17, which are embodied, for example, as passageways in the probe element 9. The first cavity 16 is, for example, an encircling groove in the bore 13 of the probe coupling element 12 and the second cavities 17 are bores, or passageways, in the probe element 9. These locking elements 15 have roundings or chamfers on their ends, whereby forces, which act in the axial direction of the probe element 9 on the inclined surfaces, produce a transverse force. This transverse force effects, that the locking elements 15 shift in the passageway in the direction transverse to the axial direction of the probe element 9. If the coaxial plug 38 is not in the coaxial socket 23, then the locking elements 15, which are embodied as pins in FIG. 4, shift in the region of the bore in the coaxial socket 23. In this state, the probe element 9 can be mounted up to its final position by the securement element 14 fixedly in the probe coupling element 12, since the locking elements 15 can protrude into the free space of the bore of the open coaxial socket 23.

In the final position of the mounting of the probe element 9 in the probe coupling unit 12, the locking elements can expand and engage into the first cavity 16 in the insulating sleeve 34 of the probe coupling element 12, whereby the bore of the coaxial plug 38 is again freed of the locking elements 15, and, thus, the coaxial plug 38 can be inserted. In the case of correct mounting of the probe element 9 in the probe coupling unit 12, so that the first cavity 16 lies opposite the second cavity 17 and the locking element protrudes into the two cavities 16, 17, the coaxial plug 38 can be easily assembled. This mounted coaxial plug 38 secures, thus, the position of the locking elements 15 in the transverse direction relative to the axial direction of the probe element 9. The locking element 15 secured by the coaxial plug 38 in position in the two cavities 16, 17 forms, thus, an axial locking of the probe element 9. This axial locking of the probe element 9 can only be canceled when the coaxial plug 38 has been removed and, thus, the locking elements 15 due to an axial tensile force T and the inclined surfaces on the ends, have been pressed back into the bore of the coaxial socket 23.

This self-securing locking mechanism, or this axial locking of the probe element 9 in the probe coupling unit 12, cannot be overcome by a predefined axial tensile force T, unless the bore of the coaxial socket 23 is first freed by pulling the coaxial plug 38. The exact mounting of the probe element 9 in the probe coupling unit 12 can also be checked by the fact that the coaxial plug 38 can only be assembled in the coaxial socket 23, when the first cavity 16 and the second cavity 17 lie exactly opposite to one another and the locking element 15, thus, by the introduction of the coaxial plug 38 can be shifted easily into the first cavity 16.

The invention claimed is:

1. A measuring probe for a measuring device for ascertaining and monitoring fill level of a medium in a container is composed essentially of two regions, a measurement-active region, and a measurement-inactive region, comprising:

a probe holding element in said measurement-inactive region of the measuring probe, which is mounted on the container and which defines an axial bore; and a probe element, which is secured in an axial bore of said probe holding element by means of a releasable securement means and which represents said measurement-active region for that part of said probe element which is outside said axial bore in said probe holding element of the measuring probe;

a first cavity provided in said axial bore of said probe holding element;

a second cavity on said probe element; and a locking element provided, which, in a final position of the mounting of said probe element in said probe holding element, protrudes into said first cavity and into the oppositely lying second cavity on said probe element and, thus, forms an axial locking, in which said releasable securement means, said first cavity, said second cavity and said locking element are so embodied, that no disturbance reflections of the high-frequency measuring signal are created in said measurement-inactive region of the measuring probe in the form of a coaxial conduction system due to resistance changes from geometrical changes.

2. The measuring device as claimed in claim 1, wherein: said locking element, said first cavity and/or said second cavity are accordingly embodied and arranged relative to one another in such a manner that, for releasing of said axial locking, a predefined axial tensile force is applied to said probe element.

3. The measuring device as claimed in claim 1, further comprising:
a screw thread provided as releasable securement means.

4. The measuring device as claimed in claim 1, further comprising:
a bayonet securement provided as releasable securement means.

5. The measuring device as claimed in claim 1, wherein: said locking element remains in said first cavity or in said second cavity during the releasing of the axial locking.

6. The measuring device as claimed in claim 1, wherein: a resilient, annular element is provided as said locking element.

7. The measuring device as claimed in claim 1, wherein: said locking element is embodied as a spring-biased element.

8. The measuring device as claimed in claim 1, wherein: an O ring is provided as locking element, said O ring comprises an elastic material, which, supplementally to the locking function, fulfills a sealing function.

9. The measuring device as claimed in claim 1, wherein: said releasable securement means is embodied as an integral part of said locking element.

10. The measuring device as claimed in claim 1, wherein: said first cavity has an undercutting relative to said locking element; and/or
that said second cavity on said probe element has an overcutting relative to said locking element.

11. The measuring device as claimed in claim 1, wherein: said second cavity on said probe element has chamfers or roundings on at least one corner of said second cavity for improving releasability of said probe element.

12. The measuring device as claimed in claim 1, wherein: said probe holding element is embodied as at least two parts, and, at a location of separation of individual parts, said first cavity is located, in which said securement element is mountable before assembly of said individual parts.

\* \* \* \* \*